United States Patent Office 3,203,901
Patented Aug. 31, 1965

3,203,901
METHOD OF MANUFACTURING ZIRCONIUM-ALUMINUM ALLOY GETTERS
Paolo Della Porta, Via Gallarate 215, Milan, Italy
Filed Feb. 15, 1962, Ser. No. 173,503
3 Claims. (Cl. 252—181.6)

The present invention relates to a method of producing getters which can absorb gases without being vaporized, for use in electron tubes or other vacuum vessels, the gas absorbing constituent of which entirely or substantially consists of a zirconium-aluminum alloy. Furthermore the invention relates to a getter produced by employing this method.

Zirconium is known to be one of the best of getter materials, but even it presents severe limitations. For example the absorption of gases by zirconium is adversely affected by surface layers, particularly by oxide layers.

Oxide layers can be removed from its surface of getter materials as titanium, zirconium and thorium by adding elements which may exhibit a chemical or physical interaction with the oxide layers, and heating in a vacuum to a temperature such that said interactions occur, and enable the subjacent active metal, to exercise their gas-absorbing effect; but the added elements are generally not active in the absorption of gases thus reducing the absorbing effect of the getter material, and sufficient reliability is not obtained in this way with respect to the extent of the removal of oxide layers from the surface of active metals.

An object of the present invention is the provision of a method of gettering with a getter material that does not require any addition of interacting elements to remove the oxide layers and to permit the absorption of gases.

An alternative way of removing the oxide layers from the surface of the getter material is to heat in a vacuum to a temperature such that the oxide diffuses inwards, but in the case of titanium, zirconium, thorium and their alloys (as the titanium-zirconium alloys) such a temperature is so high that an appreciable sintering of the getter material occurs, reducing its absorbing surface and thus its absorbing activity. Furthermore at said high temperatures, such getter material releases large quantities of gases which may be dangerous for the electron tubes or similar devices.

Another object of the present invention is the provision of a method of gettering with a getter material for which the heating temperature required to cause the oxide of the surface layers to diffuse inward is not as high as to allow sintering to occur to an appreciable extent.

A further object of the present invention is the provision of a method of gettering with a getter material for which the heating temperature required to cause the oxide layers to diffuse inwards is not as high as to produce an appreciable gas evolution.

It is known that zirconium can not be handled in air in large quantities, due to its pyrophoric properties: this is related to the high reactivity of zirconium even at room temperature, which furthermore produces a large absorption of gases during preliminary handling of the getter in air, with, as a consequence, a fall in their absorption capacity and a rise in the quantity of gases which is freed from getters in the interior of electron tubes during their industrial processing.

Therefore, still another object of the present invention is the provision of a method of gettering with a getter material that, although having a high activity under operating conditions, has however a relatively low activity on air at room temperature, which makes it stable in air, and gives high absorption capacities and low quantities of evolved gases.

Finally, an object of the present invention is to provide a method of gettering with a non vaporized getter material containing zirconium that sorbs gases much better than pure zirconium.

The above objects are achieved in one form of this invention by using an alloy of zirconium and aluminum. Although any alloy of these materials with an amount of aluminum in the range of 0 to 40 weight percent makes a good getter, the optimum alloy is approximately 16 weight percent of aluminum. The features of the invention are better illustrated from the following description taken in connection with the accompanying drawings in which.

Figure 1:
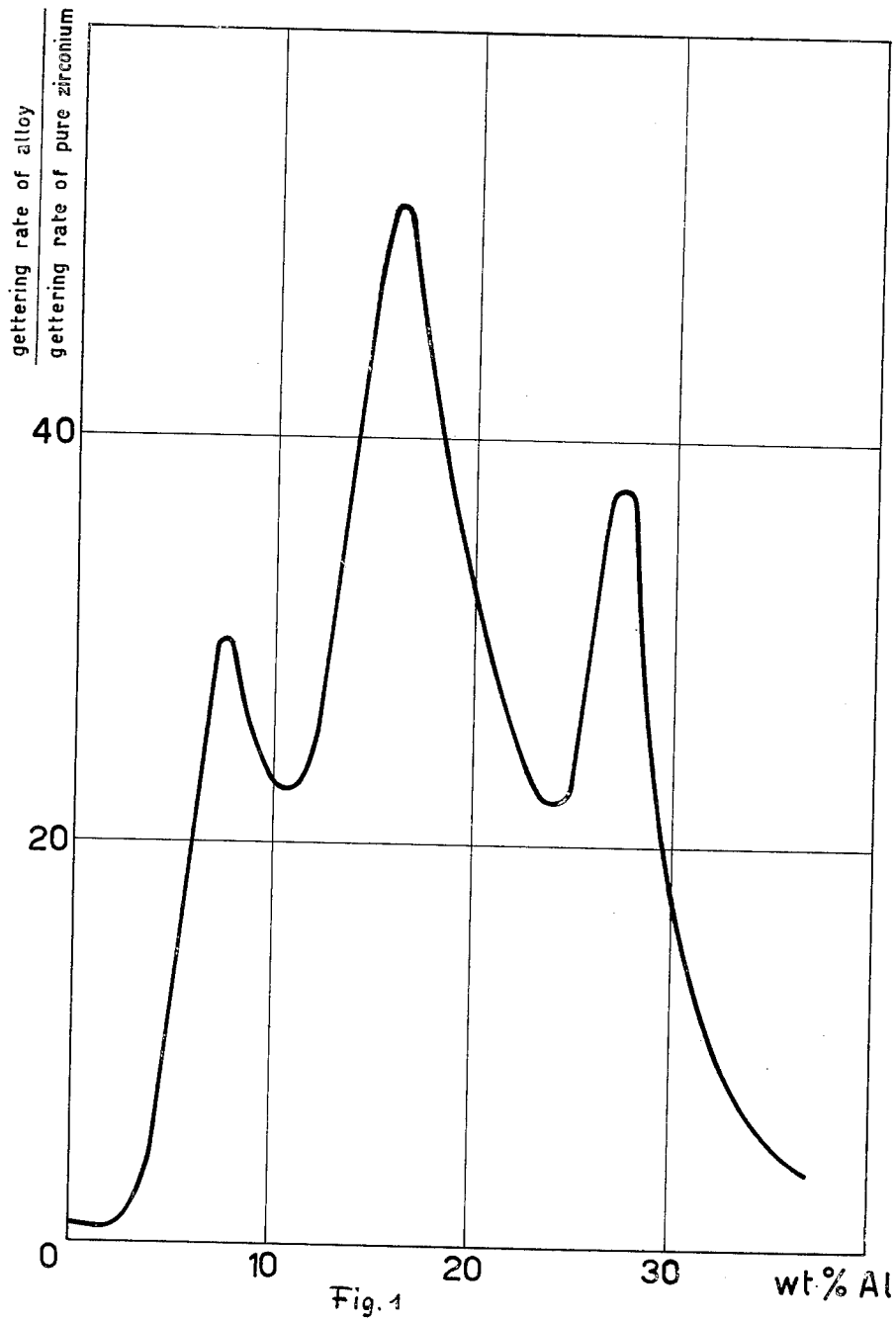
FIG. 1 is a graph of the nitrogen relative gettering rates of zirconium-aluminum alloys at 400 degrees centigrade.

The graph of FIG. 1 shows that in the case of the alloy containing approximately 16 weight percent aluminum, the gettering rate for nitrogen is more than 50 times greater than in the case of pure zirconium. Similar results were obtained for all other experimental gases.

Figure 2:
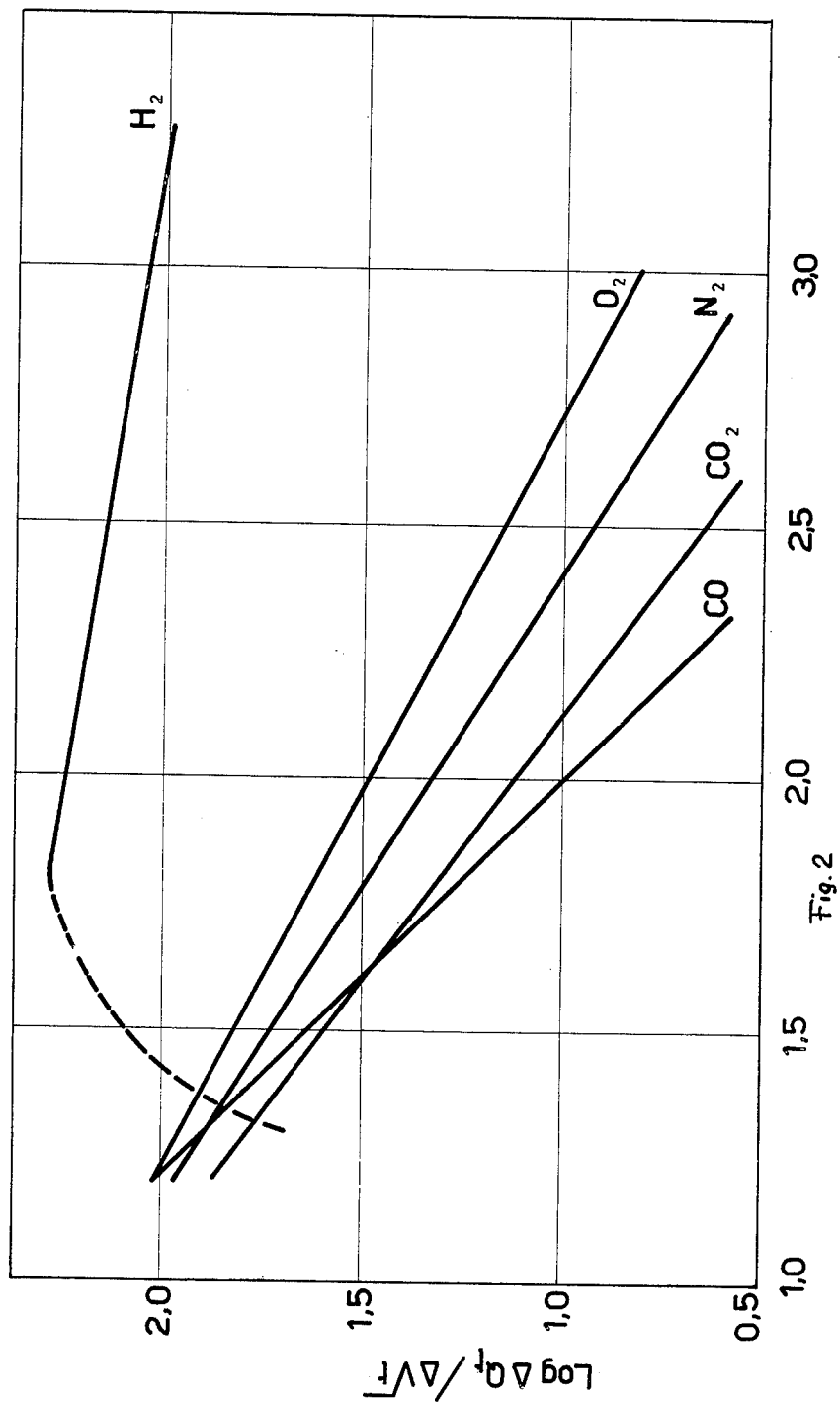
FIG. 2 is a graph of the diffusion velocity for various gases, of a zirconium-aluminum alloy, 16 weight percent of aluminum, over a range of temperatures.

The graphs of FIG. 2, where the curve of dashes for hydrogen arises from hydrogen desorption in the corresponding temperature range, allow the calculation of the activation energies for the diffusion of adsorbed gases inwards. It can easily be shown that such activation energies are much lower than the activation energies for the diffusion within pure zirconium.

Figure 3:
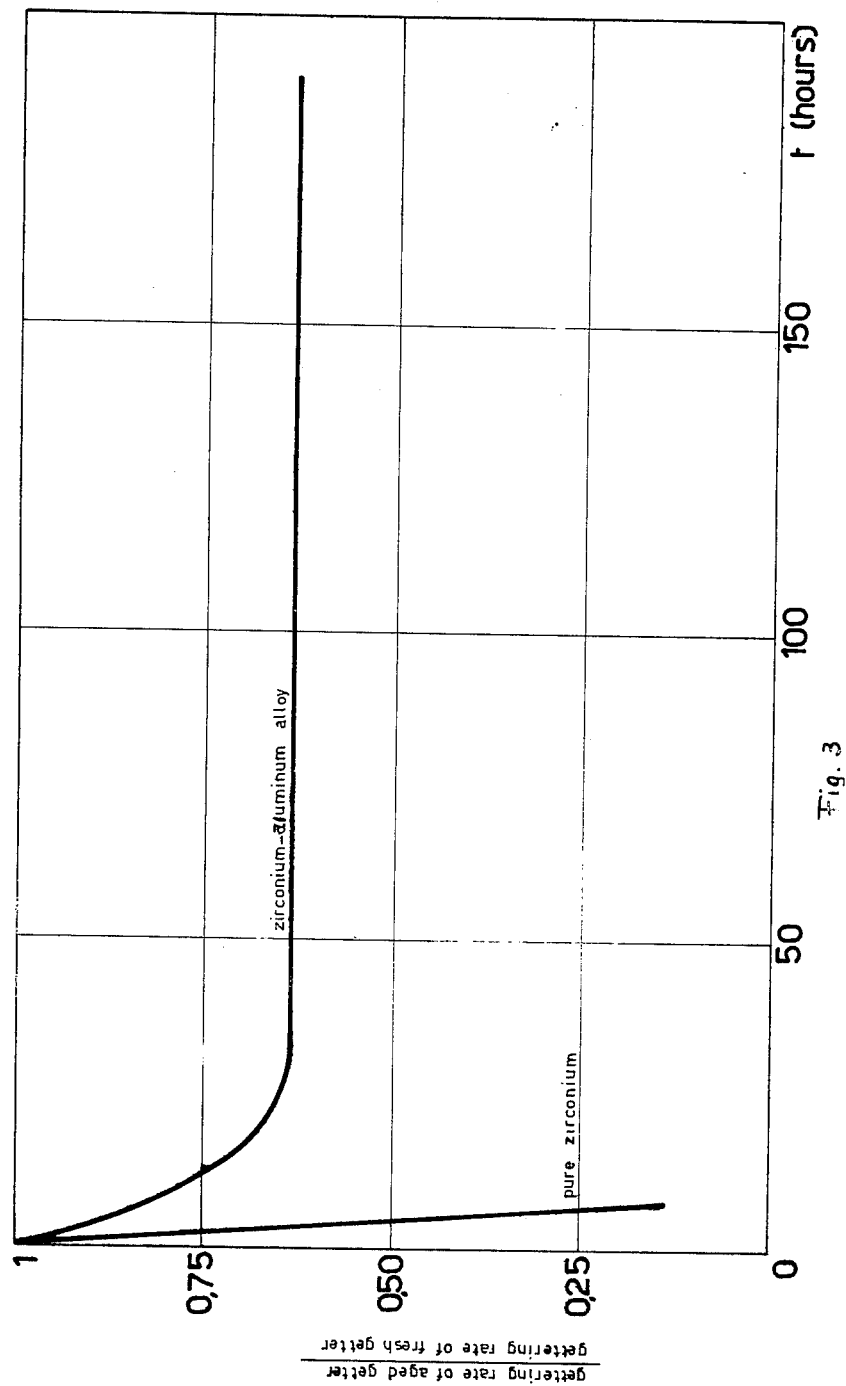
FIG. 3 is a graph of the nitrogen relative gettering rates at 400 degrees centigrade, of pure zirconium and a zirconium-aluminum alloy, 16 weight percent of aluminum over a range of aging times.

The curves of FIG. 3, where the aging was given by exposure of the getter material in a saturated water vapour atmosphere at 80 degrees centigrade, show the stabilization obtained for the zirconium-aluminum alloy, 16 weight percent of aluminum, as compared with the pure zirconium getter.

For specific purposes, zirconium may be partially replaced in the alloy by another active element, mainly of the same group, capable of giving a substitutional solution. In this way one can, for example, lower the temperature necessary for a rapid absorption of carbon monoxide, by introducing titanium, or raise the temperature at which hydrogen may be retained, by introducing thorium. Furthermore, to prevent sintering of the getter material in the case in which industrial processing requires a long heating at high temperatures, the gettering alloy may be mixed in powder form, with high melting points metals such as tungsten, tantalum, molybdenum.

The present invention is characterized by a method of producing a non-vaporizing getter for use in electron tubes or other vacuum vessels, wherein the gas absorbing constituent entirely or substantially consists of a zirconium-aluminum alloy, the powdered getter material is compressed, arranged in the vacuum vessel and activated through heating by a heater coil or the like, or by radiation, conduction, or electron bombardment from other components in the envelope.

The invention will now be explained with reference to the following examples.

*Example I*

72% in weight of pulverulent zirconium and the balance pulverulent aluminum were mixed and melted in vacuo. The resulting alloy, in powder form, was compressed to form a pellet which was mounted on a metal ribbon, activated through eddy current heating in a vacuum envelope for 30 seconds at approximately 1000 degrees centigrade. After activation, nitrogen was introduced in the envelope and the sorption velocity recorded at 400 degrees centigrade. A gettering rate for nitrogen was established of approximately 150 cm.$^3$ sec. per cm.$^2$ of geometrical surface area of the getter.

*Example II*

A similarly prepared alloy containing 84% in weight of zirconium and the balance all aluminum, in powder form and compressed in a pellet, mounted in a vacuum envelope and activated by heating for 30 seconds at approximately 1000 degrees centigrade, shows at 400 degrees centigrade a gettering rate of 220 cm.$^3$ sec.$^{-1}$ cm.$^{-2}$ for nitrogen, of 820 cm.$^3$ sec.$^{-1}$ cm.$^{-2}$ for carbon monoxide, of 710 cm.$^3$ sec.$^{-1}$ cm.$^{-2}$ for oxygen and of 1600 cm.$^3$ sec.$^{-1}$ cm.$^{-2}$ for hydrogen. The same alloy, activated in the same manner, shows for hydrogen at room temperature a gettering rate of 680 cm.$^3$ sec.$^{-1}$ cm.$^{-2}$. The same alloy, activated by heating for 60 seconds at approximately 800 degrees centigrade, shows a gettering rate for nitrogen of 190 cm.$^3$ sec.$^{-1}$ cm.$^{-2}$.

*Example III*

The same alloy as in Example II, in powder form, was mixed in a weight ratio of 1:1 with tungsten powder, compressed in a pellet, mounted in a vacuum envelope, and activated for 10 minutes at 1000 degrees centigrade. Its gettering rate for nitrogen at 400 degrees centigrade was of 195 cm.$^3$ sec.$^{-1}$ cm.$^{-2}$. The pellets, made with the same alloy without mixed tungsten powder, and activated at 1000 degrees centigrade for the same very long time of 10 minutes, show a decreased gettering rate for nitrogen at 400 degrees centigrade of 150 cm.$^3$ sec.$^{-1}$ cm.$^{-2}$.

*Example IV*

An alloy prepared in a similar manner as in the previous examples, but containing 77% in weight of zirconium, 17% in weight of aluminum and the balance all titanium, in powder form and compressed in a pellet, mounted in a vacuum envelope and activated for 30 seconds at approximately 900 degrees centigrade, shows a gettering rate of 2200 cm.$^3$ sec.$^{-1}$ cm.$^{-2}$ for hydrogen at room temperature.

What I claim is:

1. A method of producing a non-vaporizing getter comprising mixing and melting pulverulent zirconium and pulverulent aluminum and preparing a pulverulent alloy consisting of 72% by weight of zirconium and 28% by weight of aluminum, compressing said alloy into pellet form, mounting said pellet form in an enclosure, evacuating said enclosure, and subjecting said pellet form to heat at a temperature of 1000° C. for a period of thirty seconds for its activation.

2. A method of producing a non-vaporizing getter comprising mixing and melting pulverulent zirconium and pulverulent aluminum and preparing a pulverulent alloy consisting of 84% by weight of zirconium and 16% by weight of aluminum, compressing said alloy into pellet form, mounting said pellet form in an enclosure, evacuating said enclosure, and subjecting said pellet form to heat at a temperature of 1000° C. for a period of thirty seconds for its activation.

3. A method of producing a non-vaporizing getter comprising mixing and melting pulverulent zirconium and pulverulent aluminum and preparing a pulverulent alloy consisting of 84% by weight of zirconium and 16% by weight of aluminum, mixing and compressing said alloy with tungsten powder in a 1:1 ratio into pellet form, mounting said pellet form in an enclosure, evacuating said enclosure, and subjecting said pellet form to heat at a temperature of 1000° C. for a period of ten minutes for its activation.

References Cited by the Examiner

UNITED STATES PATENTS 2,855,368  10/58  Perdijk et al. _____ 252—181.6

MAURICE A. BRINDISI, *Primary Examiner.*

JOSEPH R. LIBERMAN, *Examiner.*